Patented Oct. 11, 1938

2,132,585

UNITED STATES PATENT OFFICE 2,132,585

PURIFICATION OF ALKALI METAL HYDROXIDES

Henry Mills Spittle, Northwich, England, assignor to Imperial Chemical Industries Limited, a corporation of Great Britain No Drawing. Application May 20, 1937, Serial No. 143,854. In Great Britain May 26, 1936

10 Claims. (Cl. 23—184)

This invention relates to the purification of solutions of alkali metal hydroxides.

Alkali metal hydroxide solutions obtained by certain industrial processes, such as the customary lime causticization process, frequently contain appreciable quantities of undesirable silica, alumina and manganese compounds.

An object achieved in the present invention is the provision of a convenient and effective method of removing impurities from caustic alkali solutions containing silica. Alumina and manganese compounds are also removed. The invention is based on my discovery that silica, lime and the reactive forms of $Fe_2O_3$ in caustic alkali solution produce a calcium ferric silicate insoluble in the alkali solution. As an empirical matter the best results are obtained where the reactive bodies are present at the time of action in the proportion of at least 1.3 molecules of a reactive form of $Fe_2O_3$ per molecule of $SiO_2$ and about 5 molecules of CaO. Idealized, the precipitate should have the formula $1SiO_2.1.3Fe_2O_3.5CaO$. Actually, however, alumina and manganese present in the alkali solution join the precipitate and modify the composition of the precipitate somewhat. There is practically always some alumina in the precipitate and very often some manganese. The method is particularly applicable to the dilute caustic alkali solutions obtained in causticizing carbonate solutions with lime. It is particularly convenient with caustic soda solutions. Most of these solutions contain a little iron together with much silica. It is usually necessary to add more iron and more lime.

In practical embodiments of the present invention alkali metal hydroxide solutions containing up to about 45–50 per cent by weight of the alkali metal hydroxide are digested with suitable quantities of two or more reagents, at least one reagent being selected from each of the following groups:—(1) the hydrated oxides, hydroxides and salts of trivalent iron, including salts of acids derived from ferric oxide, e. g. sodium ferrite; (2) the oxides, hydroxides and salts of calcium and other alkaline earth metals. The silicon compounds, as a result of this treatment, come down in a precipitate which can be removed by filtration, centrifuging or settling. Aluminium and manganese compounds present in the initial solution are also precipitated as a result of the treatment, although the degree of removal of these compounds may not be so high as in the case of silicon compounds. The precipitate formed by the joint use of a calcium and an iron compound is probably a complex calcium ferric silicate containing varying quantities of alumina (usually in the form of a mixed crystal) according to the nature of the initial solution.

For the purpose of the invention most reactive trivalent iron compounds appear to be effective. Naturally one should not use iron compounds that are extremely insoluble and non-reactive, e. g. unhydrated ferric oxide, or iron compounds in which the iron is contained in a very stable complex ion, as such compounds cannot be expected to take part in the reaction or reactions leading to the precipitation of the silicon compounds. It will also be understood that compounds containing silicon may not be suitable as their use might introduce more silicon than would be removed in the precipitate.

As the trivalent iron compound I can employ a hydrated ferric oxide, ferric hydroxide, ferric sulphate, ferric chloride or sodium ferrite. As the alkaline earth metal compound I can employ a compound of calcium, e. g. the oxide, hydroxide, carbonate or sulphate, not merely because of the relative cheapness and availability of such calcium compounds, but because of their very much greater purification efficiency when compared with barium, strontium or magnesium compounds. I have obtained good results when using ferric hydroxide or ferric sulphate in conjunction with calcium hydroxide or carbonate. The reagents may be added in either order or simultaneously. I usually carry out the digestion at an elevated temperature, e. g. 100° C., as I find that the reaction is thereby accelerated.

The trivalent iron compound employed may be added as such or formed in situ, if desired by oxidation of a divalent iron compound. Thus I may use ferric hydroxide or hydrated ferric oxide either as such or formed by reaction of a ferrous or ferric salt with a solution or suspension of a hydroxide or a carbonate, with injection of air in the case of a ferrous salt. Alternatively, the ferric compound for use in the process can be recovered from the precipitate formed when carrying out the process of the invention.

The amounts of reagents required depend on the form in which they are added and upon the amounts of silica, alumina or manganese oxide to be removed. Under suitable conditions and ordinary type of liquors 90 per cent or more of small amounts of silica can be removed by using at least 1.3 moles of iron compound, reckoned as $Fe_2O_3$, per mole of silica, and at least 5 moles of calcium compound, reckoned as CaO, per mole of silica, but the invention is in no way limited to these proportions.

The alkali metal hydroxide solution may be relatively dilute, e. g. it may contain about 10 per cent by weight of alkali metal hydroxide. It may contain certain substances such as carbonate, sulphate and chloride, which are often present in caustic liquors, without preventing the precipitation of the silicon compound. The solution may also be in the form of a magma or slurry containing solid calcium carbonate or hydroxide (e. g. a magma obtained in a lime causticizing process) and the said calcium carbonate or hydroxide may be utilized as the second reagent, only a reagent or reagents of the first group being added to the solution.

The following examples illustrate, but do not limit, the invention.

*Example 1*

The initial solution contains 11 per cent by weight of NaOH per 100 parts of solution and a silica content, calculated as $SiO_2$, of 400 parts per million. To 100 parts by weight of this solution, at a temperature of 100° C., 0.5 part of $Ca(OH)_2$ is added with stirring, then 0.34 part of ferric sulphate as a 20 per cent solution. The solution is maintained at 100° C. for about 2 hours, with stirring, after which the precipitate is removed from the liquor in any suitable manner. The solution now contains only about 40 parts per million of silica, i. e. 90 per cent of the silica has been removed. In addition, about 50 per cent of the alumina content of the solution, initially about 300 parts per million, is removed.

Comparative experiments showed that neither $Ca(OH)_2$ nor ferric sulphate alone, in the above quantities, would reduce the $SiO_2$ content to much below 300 parts per million. Further, even when using alone such a large quantity of ferric sulphate as 3.4 parts by weight very much less silica was removed than when using both calcium hydroxide and ferric sulphate in the above mentioned quantities.

*Example 2*

The initial solution contains about 11 per cent by weight of caustic soda, silicon (calculated as $SiO_2$) 275 parts per million and manganese 0.4 part per million. The liquor is treated with hydrated lime and ferric sulfate (used as a 20 per cent solution) in the proportion of 1.5 grams $Ca(OH)_2$ and 1 gram ferric sulfate for 150 cc. of liquor. The resulting precipitate is removed. The purified solution has a silica content of 15 parts per million (calculated as $SiO_2$) and a manganese content of 0.19 part per million.

As many apparently widely different embodiments of this invention may be made without departing from the spirit and scope thereof, it is to be understood that I do not limit myself to the specific embodiments thereof except as defined in the appended claims.

I claim:

1. In the purification of caustic alkali solutions containing silica in amount in excess of the amount which will combine with the ferric iron present, the process which comprises adding to said solution a trivalent iron compound in amount sufficient to provide, in connection with any trivalent iron already present, a molecular ratio of ferric iron calculated as $Fe_2O_3$ to silica of at least 1.3:1 and digesting the mixture thus formed, at an elevated temperature in contact with a material selected from the group consisting of oxides, hydroxides and salts of the alkaline earth metals, thereby forming an insoluble complex ferrisilicate and removing the ferrisilicate thus formed.

2. In the purification of caustic soda liquors containing silica in amount in excess of the amount which will combine with the ferric iron present, the process which comprises adding to said solution a trivalent iron compound in amount sufficient to provide in connection with any trivalent iron already present, a molecular ratio of ferric iron calculated as $Fe_2O_3$ to silica of at least 1.3:1 and digesting the mixture thus formed, at an elevated temperature in contact with a material selected from the group consisting of oxides, hydroxides and salts of the alkaline earth metals, thereby forming an insoluble complex ferrisilicate, and removing the ferrisilicate thus formed.

3. In the purification of caustic alkali liquors containing up to 50 per cent by weight of alkali hydroxide and containing silica in an amount in excess of the amount which will combine with the ferric iron present, the process which comprises adding to said solution a trivalent iron compound in amount sufficient to provide, in connection with any trivalent iron already present, a molecular ratio of ferric iron calculated as $Fe_2O_3$ to silica of at least 1.3:1 and maintaining the mixture thus formed, at an elevated temperature in contact with a material selected from the group consisting of oxides, hydroxides and salts of the alkaline earth metals, thereby forming an insoluble complex ferrisilicate, and removing the ferrisilicate thus formed.

4. In the purification of caustic soda liquors containing silica in amount in excess of the amount which will combine with the ferric iron present, the process which comprises adding to said solution a trivalent iron compound in amount sufficient to provide, in connection with any trivalent iron already present, a molecular ratio of ferric iron calculated as $Fe_2O_3$ to silica of at least 1.3:1 and maintaining the mixture thus formed, at an elevated temperature in contact with a material selected from the group consisting of the oxide, hydroxide and salts of calcium, thereby forming an insoluble complex ferrisilicate, and removing the ferrisilicate thus formed.

5. In the purification of caustic soda liquor containing silica in amount in excess of the amount which will combine with the ferric iron present, the process which comprises adding to said solution a divalent iron compound and oxidizing the said compound sufficiently to provide in connection with any trivalent iron already present, a molecular ratio of ferric iron calculated as $Fe_2O_3$ to silica of at least 1.3:1 and digesting the mixture thus formed, at an elevated temperature in contact with a material selected from the group consisting of oxide, hydroxide and salts of calcium, thereby forming an insoluble complex ferrisilicate, and removing the ferrisilicate thus formed.

6. In the purification of caustic soda liquor containing silica in amount in excess of the amount which will combine with the ferric iron present, the process which comprises adding to said solution a trivalent iron compound in amount sufficient to provide in connection with any trivalent iron already present, a molecular ratio of ferric iron calculated as $Fe_2O_3$ to silica of at least 1.3:1 and maintaining the mixture thus formed, at an elevated temperature in contact with a mixture selected from the group consisting of the oxide, hydroxide and salts of calcium in amount sufficient to provide at least 5 mols of calcium calculated as CaO per mol of silica, thereby forming an insoluble complex ferrisilicate and removing the ferrisilicate thus formed.

7. In the purification of caustic alkali liquors resulting from the causticization of alkali carbonates with lime by removing silica and other impurities therefrom, the process which comprises adding to such a liquor a reactive form of ferric iron and a reactive calcium compound, the amount of each being sufficient to bring down silica, ferric iron and lime in the solution as a precipitate having the approximate composition $SiO_2.1.3Fe_2O_3.5CaO$ and removing the precipitate from the purified liquor.

8. In the purification of caustic alkali liquors containing silica in amount in excess of the amount which will combine with any ferric iron already present in the solution, the process which comprises incorporating in such a liquor a reactive calcium compound selected from the group consisting of the oxide, hydroxide and salts of calcium, and an iron compound of such character as will yield trivalent iron in the liquor by dissolution, the amount of iron and calcium being sufficient to bring down silica, ferric iron and lime as an insoluble ferrisilicate precipitate containing CaO, $SiO_2$ and $Fe_2O_3$, with the $Fe_2O_3:SiO_2$ ratio at least 1.3:1; and removing the precipitate from the purified liquor.

9. In the purification of caustic alkali solutions containing silica, the process which comprises subjecting such solutions, in contact with substantial amounts of a material selected from the group consisting of alkaline earth metal oxides, hydroxides and salts, to the action of an added ferric compound, said ferric compound being present in sufficient amount to provide a molecular ratio of ferric iron, calculated as $Fe_2O_3$, to said silica greatly in excess of 1:1, and removing the precipitate formed.

10. In the purification of caustic alkali solutions containing silica, the process which comprises subjecting such solutions, in contact with a substantial amount of a calcium compound selected from the group consisting of calcium oxide, hydroxide and carbonate, to the action of an added ferric compound, said ferric compound being present in sufficient amount to provide a molecular ratio of ferric iron, calculated as $Fe_2O_3$, to said silica greatly in excess of 1:1, and removing the precipitate formed.

HENRY MILLS SPITTLE.